(12) United States Patent
Lee (10) Patent No.: US 8,728,210 B2
(45) Date of Patent: May 20, 2014

(54) EXHAUST GAS TREATMENT APPARATUS AND METHOD

(75) Inventor: Hsueh Yuan Lee, Hsinchu (TW)

(73) Assignee: Hsueh Yuan Lee, Hsinchu County (TW)

( * ) Notice: Subject to any disclaimer, the term of this patent is extended or adjusted under 35 U.S.C. 154(b) by 129 days.

(21) Appl. No.: 13/543,693

(22) Filed: Jul. 6, 2012

(65) Prior Publication Data

US 2013/0011321 A1   Jan. 10, 2013

Related U.S. Application Data

(60) Provisional application No. 61/505,533, filed on Jul. 7, 2011.

(51) Int. Cl.
  *C01C 1/12* (2006.01)
  *B01D 53/18* (2006.01)
  *B01D 53/14* (2006.01)
  *B01D 53/58* (2006.01)

(52) U.S. Cl.
  USPC ............... 95/199; 95/223; 95/232; 95/228; 96/234; 96/242; 423/237; 423/352; 422/169

(58) Field of Classification Search
  USPC ................... 95/232; 423/237, 352
  See application file for complete search history.

(56) References Cited

U.S. PATENT DOCUMENTS

| | | | | |
|---|---|---|---|---|
| 3,503,970 | A | * | 3/1970 | Inoue et al. .................... 544/201 |
| 4,055,627 | A | * | 10/1977 | Guadalupi .................... 423/359 |
| 2004/0265199 | A1 | * | 12/2004 | MacKnight ................... 423/220 |
| 2008/0250933 | A1 | * | 10/2008 | Yun ................................ 96/251 |

FOREIGN PATENT DOCUMENTS

CN        200999238 Y    *   1/2008

OTHER PUBLICATIONS

CN 200999238 English Abstract.*

* cited by examiner

*Primary Examiner* — Duane Smith
*Assistant Examiner* — Cabrena Holecek
(74) *Attorney, Agent, or Firm* — Chun-Ming Shih (57) ABSTRACT

An exhaust gas treatment apparatus comprises an ammonia absorption system and an ammonia conversion system. The ammonia absorption receives ammonia-containing tail gas generated by a semiconductor process, and removes dust from the tail gas, absorbs and decomposes ammonia gas from the tail gas, converts the ammonia gas into aqueous ammonia, and emits the tail gas without the dust and the ammonia to an external environment. The ammonia conversion system receives the ammonia solution from the ammonia absorption system, and converts it into gaseous ammonia, and then converts the gaseous ammonia to produce liquid ammonia by vaporization and cooling-pressurized liquefaction. After that, the liquid ammonia is purified by a purification system to formed hi-purity liquid ammonia.

20 Claims, 5 Drawing Sheets

EXHAUST GAS TREATMENT APPARATUS AND METHOD

CROSS-REFERENCE TO RELATED APPLICATIONS

This application claims the benefit of the filing date priority of a U.S. Provisional Application No. 61/505,533, filed on Jul. 7, 2011, the disclosure of which is incorporated herein by reference in its entirety.

FIELD OF THE INVENTION

The invention relates to a gas treatment apparatus and method; more particularly, to an exhaust gas treatment apparatus and method.

DESCRIPTION OF THE PRIOR ART

Ammonia is widely used in etching, epitaxial, or cleaning processes in the semiconductor or the optoelectronic industry such as the Light Emitting Diode (LED) industry. Since only part of the ammonia is reacted during the process, the unreacted ammonia will be expelled from the processing equipment along with the tail gas to an exhaust gas treatment system at the end of the process. The ammonia gas and/or the dust or the like have to be removed from the tail gas in order to meet the provisions of the environmental protection act.

Two methods are generally used for treating the tail gas containing ammonia, i.e., an acid absorption method and a combustion method. In the acid absorption method, sulfuric acid or phosphoric acid is usually used as an absorption media to convert the ammonia in the tail gas into ammonium sulfate or ammonium phosphate that will be discharged in the subsequent process. In the combustion method, the tail gas containing ammonia is cracked at high temperature in a combustion engine, then oxygen is introduced thereinto to assist with the combustion before exhaustion. Nitrogen oxides (NOx) may be unfavorably produced during the treatment and high operation and maintenance costs are inevitable. Besides, both methods can not recycle the ammonia in the tail gas, which is really not economic and green.

As mentioned above, in current semiconductor processes, since a large amount of hi-purity ammonia is required, there is a need to solve the above problems by providing a treatment apparatus or method that is cost-effective, environment friendly, and capable of recycling the ammonia in the tail gas.

SUMMARY OF THE INVENTION

In view of the above, the present invention provides an exhaust gas treatment apparatus and an exhaust gas treatment method that can solve the problems of the ammonia gas cannot be reused after removing from the tail gas in the ammonia-contained tail gas treatment apparatus or process of the prior art.

The present invention discloses an exhaust gas treatment apparatus that is adapted to receive tail gas from a industry equipment such as semiconductor equipment, wherein the tail gas contains dust, ammonia gas ($NH_3$), and other mixed gas such as nitrogen ($N_2$), hydrogen ($H_2$) and methane ($CH_4$).

The exhaust gas treatment apparatus comprises an ammonia absorption system and an ammonia conversion system.

The ammonia absorption system of the exhaust gas treatment apparatus comprises a dust scrubber, a wetted-wall tower, a circulation tank, a mist absorber, a water sealed vacuum pump and a first reservoir. The dust scrubber is receiving the tail gas and removing the dust from the tail gas to produce dust removal tail gas. The wetted-wall tower is connected to the dust scrubber for absorbing the ammonia gas in the dust removal tail gas and converting the ammonia gas into aqueous ammonia. The circulation tank is connected to the wetted-wall tower for receiving the aqueous ammonia and providing an absorption solution (pure water or aqueous ammonia subsequently formed) for the wetted-wall tower circulatly, wherein the absorption solution serves to absorb the ammonia gas separated from the dust removal tail gas. The mist absorber is connected to the wetted-wall tower for absorbing the ammonia gas that remains in the dust removal tail gas and converting the ammonia gas to low concentration of aqueous ammonia. The water sealed vacuum pump is connected to the mist absorber for pumping, washing and exhausting the dust removal tail gas. The first reservoir is connected to the circulation tank for collecting the aqueous ammonia.

The ammonia conversion system of the exhaust gas treatment apparatus comprises an evaporator, a dehydrator, a cooling and compression device, a refrigerator, a heat pump and a second reservoir. The evaporator is connected to the first reservoir for vaporizing the aqueous ammonia to form gaseous ammonia. The dehydrator is connected to the evaporator for removing moisture of the gaseous ammonia and pre-cooling the gaseous ammonia. The cooling and compression device is connected to the dehydrator for cooling and pressurizing the dehydrated gaseous ammonia and compressing the dehydrated gaseous ammonia to form liquid ammonia. The refrigerator is connected to the cooling and compression device for supplying cryogenic liquid to the cooling and compression device and generating heat. The heat pump is connected to the evaporator and the refrigerator respectively, the heat pump is providing the heat generated from the refrigerator to the evaporator and supplying cooling water to the ammonia conversion system. The second reservoir is connected to the cooling and compression device for collecting and storing the liquid ammonia.

The present invention also discloses an exhaust gas treatment method, comprises following steps: (a) removing dust from tail gas using a dust scrubber to produce dust removal tail gas; (b) absorbing and separating ammonia gas using a wetted-wall tower to form aqueous ammonia; (c) removing remaining ammonia gas in the dust removal tail gas using a mist absorber to form low concentration of aqueous ammonia; (d) pumping, washing and exhausting the dust removal tail gas using a water sealed vacuum pump; (e) collecting and storing the aqueous ammonia form the wetted-wall tower to a first reservoir; (f) vaporizing the aqueous ammonia using an evaporator to form gaseous ammonia; (g) removing moisture from the gaseous ammonia using a dehydrator; (h) cooling and pressurizing the gaseous ammonia to produce liquid ammonia using a cooling and compression device after removing the moisture from the gaseous ammonia; and (i) collecting the liquid ammonia in a second reservoir.

The effect of the present invention is achieved in the following way. The dust and the ammonia gas can be removed from the tail gas by the ammonia absorption system of the exhaust gas treatment apparatus, such that the amount of ammonia is reduced in the tail gas greatly and meets the emission standards for the waste gas. In addition, the ammonia gas absorbed and separated from the tail gas can be recycled and converted by the ammonia conversion system of the exhaust gas treatment apparatus to high-concentration of liquid ammonia that can be used as a final or backup product. This is advantageous because the ammonia gas that is regarded as waste and a pollutant can be recycled, thereby saving appreciable cost in the semiconductor manufacturing process.

The characteristics, realization and functions of the invention are disclosed in the following description with reference to the preferred exemplified embodiments and the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

An exhaust gas treatment apparatus is applied to an semiconductor process and connected to an exhaust end of the semiconductor equipment for receiving and treating tail gas generated by a back end of the semiconductor process. The tail gas contains dust, mixed gas such as $N_2$, $H_2$ and $CH_4$, and ammonia gas ($NH_3$) which is used or generated in the semiconductor process.

Figure 1:
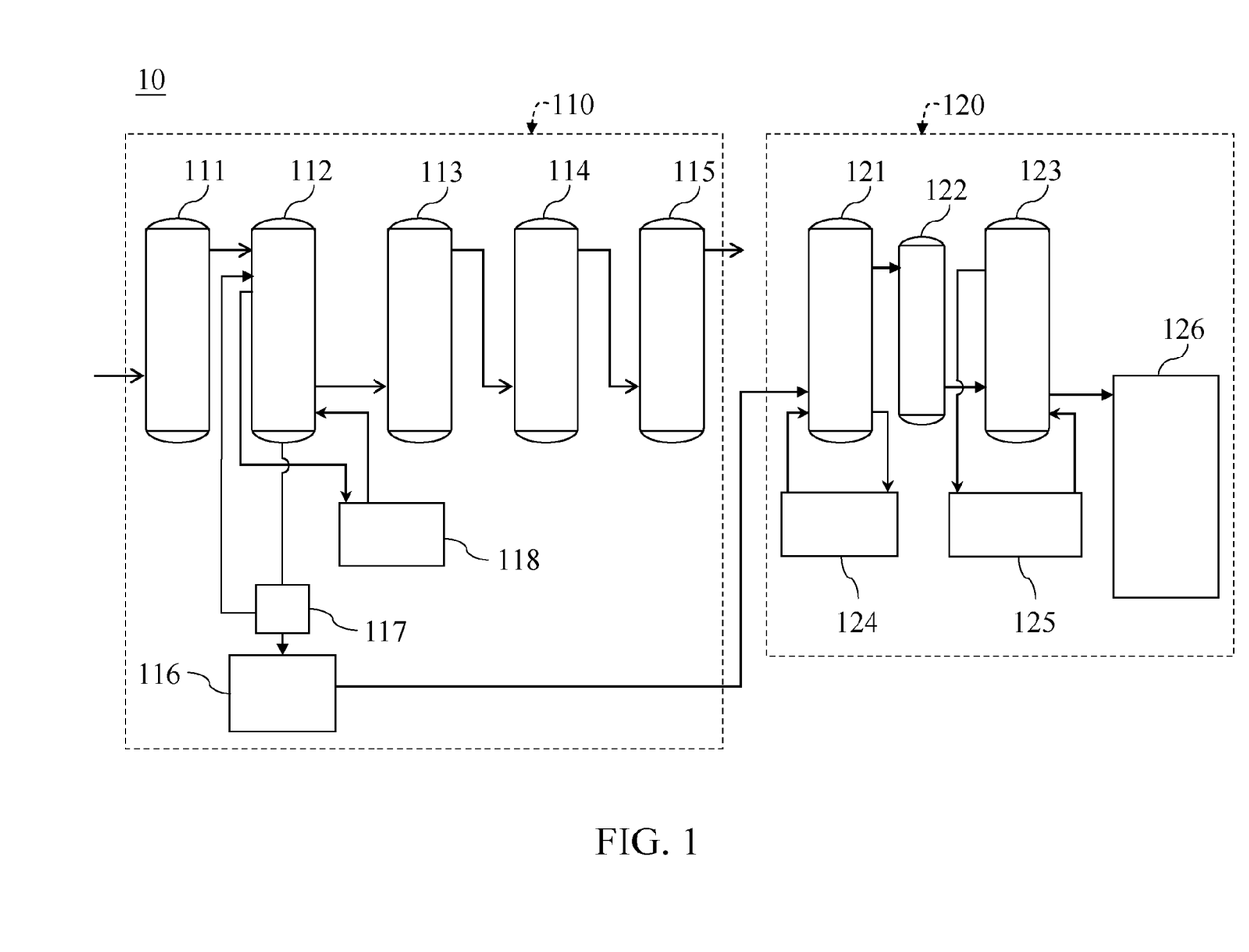
FIG. 1 is a plan view of an exhaust gas treatment apparatus according to a first embodiment of the present invention.

As shown in FIG. 1, the exhaust gas treatment apparatus 10 comprises an ammonia absorption system 110 and an ammonia conversion system 120, and the exhaust gas treatment apparatus 10 is treating the tail gas for cleaning and recycling under about 1 atmospheric pressure (atm).

The ammonia absorption system 110 of the exhaust gas treatment apparatus 10 comprises a dust scrubber 111, a wetted-wall tower 112, a mist absorber 113, an absorption-decomposition tank 114, a water sealed vacuum pump 115, a first reservoir 116 and a circulation tank 117.

The dust scrubber 111 which is connected to the exhaust end of the semiconductor equipment (not shown) for receiving the tail gas also provides pure water to absorb part of ammonia gas in the tail gas to form aqueous ammonia. So an alkaline environment is formed within the dust scrubber 111. Most of the dust will be separated from the tail gas and settle to the dust scrubber 111 once coming into contact with the aqueous ammonia. Furthermore, some of the metal dust such as molybdenum (Mo), indium (In), gallium (Ga) may be recycled from the aqueous ammonia in the dust scrubber 111 if desired.

The wetted-wall tower 112 is connected between the dust scrubber 111 and the circulation tank 117. An absorption solution (pure water or aqueous ammonia subsequently formed) is provided by the circulation tank 117 for the wetted-wall tower 112 so as to form therein a high specific surface area water film that facilitates quick absorption of the ammonia gas ($NH_3$) from the dust removal tail gas. As a result, high concentration (15~29%, for example, 17.5%) of aqueous ammonia (also known as ammonium hydroxide, $NH_4OH$) can be obtained. The aqueous ammonia at a predetermined concentration is collected in the first reservoir 116 via a pipe.

As an example, the wetted-wall tower 112 may be further connected to a water feeder 118 containing cooling water of a temperature below 20° C., for example, 4° C.-20° C. The cooling water serves to remove the heat generated by the hydration of ammonia gas ($NH_3$) and water ($H_2O$) in the wetted-wall tower 112.

The mist absorber 113 is connected to the wetted-wall tower 112 and receives the dust removal tail gas from the wetted-wall tower 112. The ammonia gas that does not be absorbed by the wetted-wall tower 112 will be pumped to the mist absorber 113 along with the dust removal tail gas, and will be absorbed by mist in the mist absorber 113 to produce low concentration aqueous ammonia, such that increasing a preferred absorption rate of the ammonia gas is achieved and facilitating a removing rate of the ammonia gas. In addition, the low concentration aqueous ammonia formed in the mist absorber 113 is able to feedback into the circulation tank 117 for providing to the wetted-wall tower 112 to absorb the ammonia gas.

The absorption-decomposition tank 114 is connected to the mist absorber 113 for receiving the dust removal tail gas treated by the mist absorber 113. After the mist absorbers treatment, not only the gases that do not be absorbed by the water remain in the dust removal tail gas, such as $N_2$, $H_2$ and $CH_4$ . . . etc., but part of the ammonia gas that does not be absorbed by the mist absorber also remains in the dust removal tail gas. Therefore, the absorption-decomposition tank 114 removes these remaining ammonia gas in the dust removal tail gas by reacting the ammonia gas with a commercial acid (such as phosphoric acid) to form an ammonium phosphate solution; or decomposing by strong oxidizer to form $N_2$ and $H_2O$. In this way, the dust removal tail gas only contains the mixed gas such as $N_2$ and $H_2$ and an extremely small amount of the ammonia gas, even without the ammonia gas.

The water sealed vacuum pump 115 connects to the absorption-decomposition tank 114. The water sealed vacuum pump 115 extracts the dust removal tail gas from the absorption-decomposition tank 114 and washes the dust removal tail gas by a circular water, and then exhausts the dust removal tail gas to the external environment. In addition, in the other embodiment of the present invention, the water sealed vacuum pump 115 further comprises a water-circulated tank for replacing the absorption-decomposition tank 114 to simplify the tail gas treatment process.

The first reservoir 116 is connected to the circulation tank 117. The first reservoir 116 collects high concentration (15-29%) of the aqueous ammonia ($NH_4OH$) from the circulation tank 117, and provides the aqueous ammonia to the ammonia conversion system 120.

As shown in FIG. 1, the ammonia conversion system 120 of the exhaust gas treatment apparatus 10 comprises an evaporator 121, a dehydrator 122, a cooling and compression device 123, a heat pump 124, a refrigerator 125, and a second reservoir 126.

The evaporator 121 is connected to the first reservoir 116 of the ammonia absorption system 110. The evaporator 121 receives the aqueous ammonia from the first reservoir 116, and vaporizes the aqueous ammonia to produce gaseous ammonia at a temperature of higher than 20° C. Besides, part of the aqueous ammonia that does not be vaporized will form low concentration aqueous ammonia, and be able to feedback into the ammonia absorption system 110 for reuse. In this way, the ammonia absorption system 110 and the ammonia conversion system 120 form a hermetic environment that does not exhaust liquid waste.

The dehydrator 122 is connected between the evaporator 121 and the cooling and compression device 123. After vaporizing, the gaseous ammonia is feed into the dehydrator 122 to remove moisture in the gaseous ammonia and to pre-cool the gaseous ammonia, and then, the pre-cooled gaseous ammonia is feed into the cooling and compression device for cooling and pressurizing the pre-cooled gaseous ammonia to produce liquid ammonia. In addition, the moisture removed by the dehydrator 122 forms low concentration of aqueous ammonia in the above-mentioned processes and is able to feedback into the ammonia absorption system 110 for reuse, in this way, the ammonia absorption system 110 and the ammonia conversion system 120 form a hermetic environment that does not exhaust liquid waste.

The cooling and compression device 123 is connected to the dehydrator 122 for receiving the dehydrated gaseous ammonia and cooling and pressurizing the gaseous ammonia to produce liquid ammonia ($NH_{3(L)}$).

The heat pump 124 is connected to the evaporator 121, and the refrigerator 125 is connected to the cooling and compression device 123. The refrigerator 125 coordinates with the cooling and compression device 123 to cool and pressurize the dehydrated gaseous ammonia at low temperature (for example, lower than 10° C.). The heat pump 124 also connects to the refrigerator 125 and receives heat generated by the refrigerator 125 in operation. In addition, the heat pump 124 provides cooling water in the ammonia conversion system and provides the heat generated by the refrigerator 125 to the evaporator 121 for proceeding a heating process, it makes the heat generated by the refrigerator is reusable, such that reducing the energy loss and enhancing the power-saving efficiency, when the ammonia absorption system 110 and the ammonia conversion system 120 are in operation.

The second reservoir 126 is connected to the cooling and compression tank 123. After cooling and pressurizing, the gaseous ammonia converts to the liquid ammonia, and then the liquid ammonia accumulates and storages in the second reservoir 126, and being a ready-to-use product.

Figure 2:
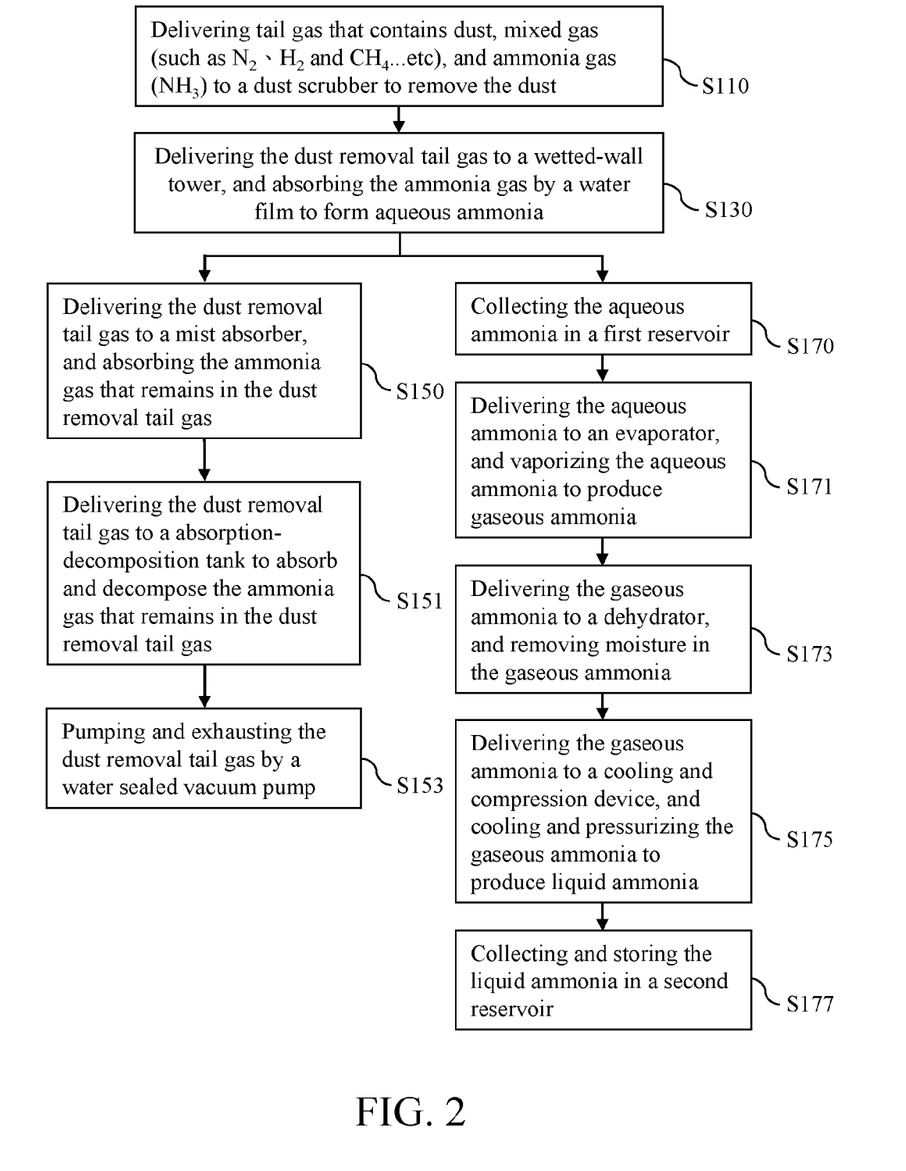
FIG. 2 is a flowchart of an exhaust gas treatment method according to the first embodiment of the present invention.

FIG. 2 is a flowchart of an exhaust gas treatment method according to the first embodiment of the present invention. Referring to FIG. 2 together with FIG. 1, the tail gas containing for example dust, mixed gases (ex. $N_2$, $H_2$ and $CH_4$), and ammonia gas ($NH_3$) in the ammonia absorption system 110 is treated under about 1 atm of pressure. The exhaust gas treatment method of the embodiment includes: as a first step, delivering the tail gas to the dust scrubber 111 for removing the dust (S110), and absorbing the ammonia gas from the tail gas by pure water provided by the dust scrubber 111. In this way, when the ammonia gas reacts with the pure water, part of the ammonia gas is formed aqueous ammonia and an alkaline environment is formed within the dust scrubber 111. In addition, when the dust in the tail gas contacts with the aqueous ammonia, most of the dust will be separated from the tail gas and settle to the dust scrubber 111.

Secondly, delivering the dust removal tail gas to the wetted-wall tower 112, and providing the absorption solution (pure water or aqueous ammonia subsequently formed) to the wetted-wall tower 112 circulatly by the circulation tank 117 so as to form the high specific surface area water film in the wetted-wall absorber 112 that absorbing the ammonia gas in the dust removal tail gas, such that the ammonia gas is immediately absorbed by the water film and forms high concentration (15-29%) of aqueous ammonia ($NH_4OH$), for example, 17.5% aqueous ammonia for industrial use or production of the liquid ammonia in the subsequent process (S130). In this step, the cooling water is able to provide to the wetted-wall tower 112 by the water feeder 118 to remove heat generated by hydration of the ammonia gas ($NH_3$) and the water ($H_2O$), and a temperature of the cooling water is lower than 20° C., for example, between 4° C.-20° C.

After that, pumping the dust removal tail gas to the mist absorber 113, and absorbing the ammonia gas that remains in the dust removal tail gas by the mist in the mist absorber 113, wherein the ammonia gas reacts with the mist to form low concentration of aqueous ammonia, and then, removes from the dust removal tail gas (S150). In addition, low concentration of the aqueous ammonia is able to feedback into the circulation tank 117 for providing to the wetted-wall tower 112 to absorb the ammonia gas. At this step, the dust removal tail gas contains the mixed gas that does not be absorbed by the water, such as $N_2$, $H_2$ . . . etc., and maybe remains an extremely small amount of the ammonia gas.

Next, pumping the dust removal tail gas from the mist absorber 113 to the absorption-decomposition tank 114, and absorbing and decomposing the dust removal tail gas in the absorption-decomposition tank 114 (S151). The ammonia gas that remains in the dust removal tail gas is absorbed by the acid and reacts with the acid to form an ammonium salt (ex. ammonium phosphate); or decomposed by the strong oxidizer to form $N_2$ and $H_2O$. After that, the dust removal tail gas only contains the mixed gas such as $N_2$ and $H_2$ and an extremely small amount of the ammonia gas, even without the ammonia gas.

Figure 3:
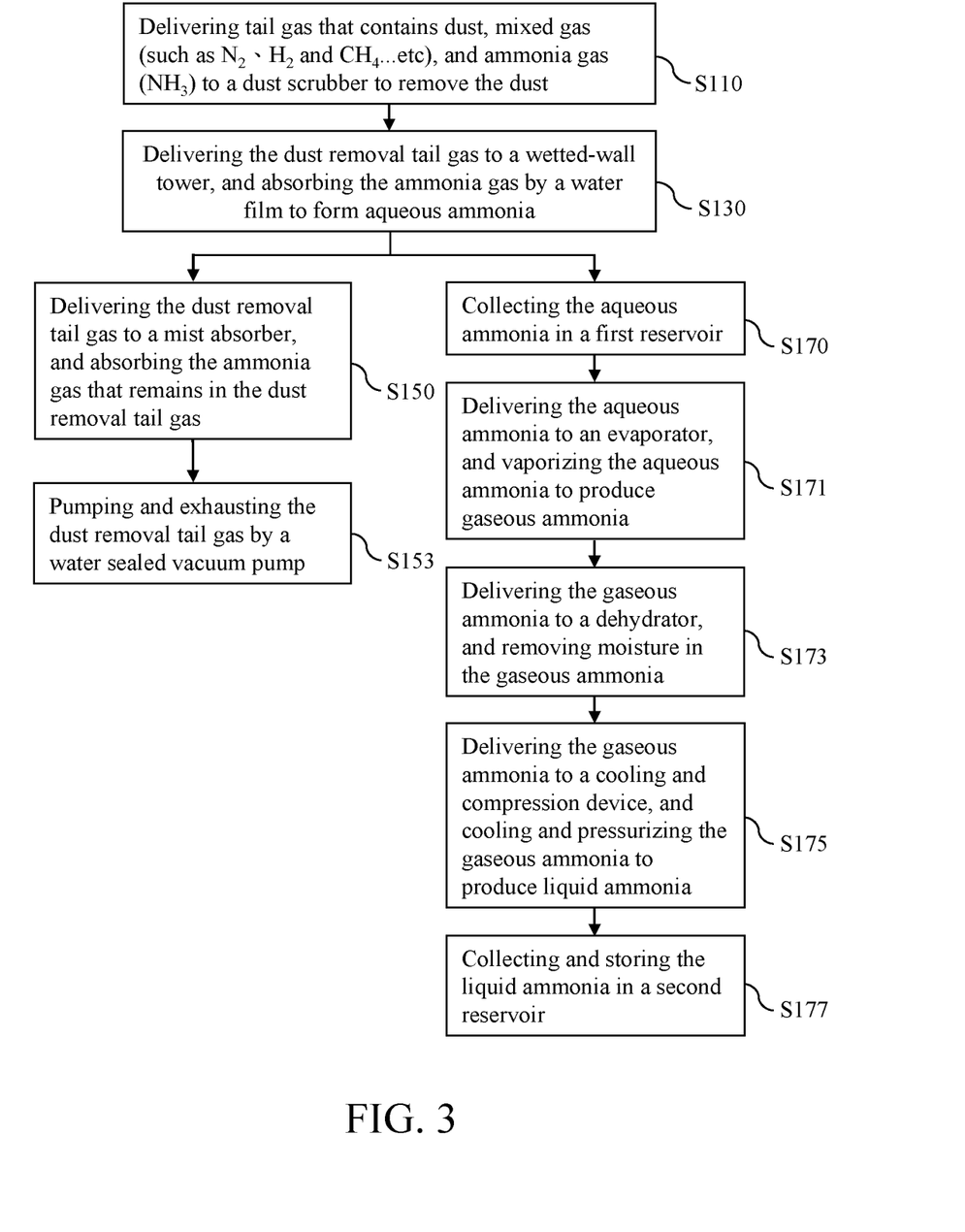
FIG. 3 is a flowchart of an exhaust gas treatment method according to the other embodiment of the present invention.

Finally, pumping the dust removal tail gas from the absorption-decomposition tank 114 to the water sealed vacuum pump 115, and washing and exhausting the dust removal tail gas by the water sealed vacuum pump 115 (S153). In addition, in the other embodiment of the present invention, the water sealed vacuum pump 115 further comprises a water-circulated tank for replacing the absorption-decomposition tank 114 to absorb and decompose the ammonia gas that remains in the dust removal tail gas, thereby simplifying the tail gas treatment process (as shown in FIG. 3).

Please refer to FIGS. 1-2, the exhaust gas treatment method as mentioned above, when the concentration of the aqueous ammonia formed in the wetted-wall tower 112 is desired, the aqueous ammonia is collected in the first reservoir 116 via the pipe (S170). Then, delivering the aqueous ammonia to the evaporator 121 of the ammonia conversion system 120 for vaporizing to produce gaseous ammonia at a temperature higher than 20° C. (ex. 40° C.) (S171). Next, delivering the gaseous ammonia from the evaporator 121 to the dehydrator 122, and removing moisture in the gaseous ammonia and pre-cooling the gaseous ammonia at low temperature (ex. lower than 10° C.) (S173).

After that, delivering the dehydrated gaseous ammonia from the dehydrator 122 to the cooling and compression device 123, and cooling and pressurizing the gaseous ammonia to produce liquid ammonia, for example, liquefying the gaseous ammonia at low temperature (lower than 10° C.) by cooling and pressurizing. In the meantime, the dehydrated gaseous ammonia is cooling and pressurizing at the temperature lower than 10° C., that facilitate the gaseous ammonia to liquefy.

Finally, collecting the liquid ammonia in the second reservoir 126 (S177). It is notable that the liquid ammonia collected in the second reservoir 126 can be used as a final product directly, or be purified in the subsequent process for use in the system equipment of the semiconductor factory.

In addition, when the aqueous ammonia in vaporized to the gaseous ammonia as above-mentioned, part of the ammonia solution does not be vaporized and becomes low concentration of aqueous ammonia, it is able to feedback into the ammonia absorption system 110 for reuse. Moreover, low concentration of the aqueous ammonia absorbed by the dehydrator 122 is able to feedback into the ammonia absorption system 110 for reuse, too. In this way, the ammonia absorption system 110 and the ammonia conversion system 120 form a hermetic environment that does not exhaust liquid waste.

As stated above, the effect of the present invention is that not only the dust and the ammonia gas can be removed from the tail gas effectively, but the removed ammonia gas is recyclable, thereby saving the ammonia usage and reducing the cost in the semiconductor process. In addition, through the cooperation of the heat pump, refrigerator, evaporator, and cooling and compression device, an efficient energy cycle is created within the apparatus, further lowering the semiconductor processing cost.

Figure 4:
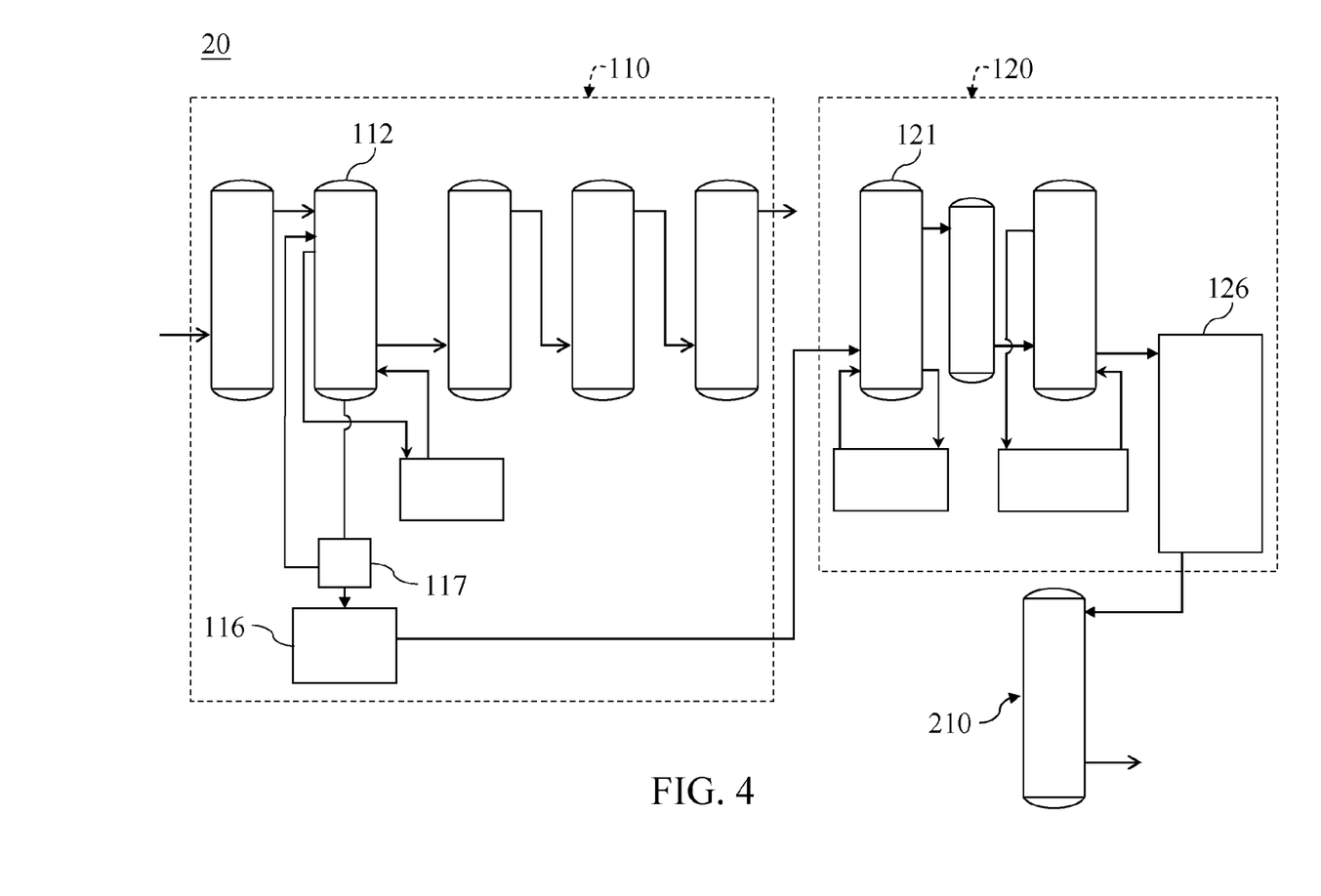
FIG. 4 is a plan view of an exhaust gas treatment apparatus according to a second embodiment of the present invention.

FIG. 4 illustrates the exhaust gas treatment apparatus 20 of the second embodiment which is similar to that of the first embodiment except that the exhaust gas treatment apparatus 20 further comprises a purification system 210.

The purification system 210 is connected to the second reservoir 126 of the ammonia conversion system 120. The purification system 210 comprises an anion-cation absorber, a dehydrator, a heat pump, a refrigerator, a cooling and compression device, a deaerating device, and a rundown tank. The liquid ammonia that collected and stored in the second reservoir 126 is delivered to the purification system, and has been purified to obtain at least 6N hi-purity liquid ammonia product by vaporization, dehydration, anion-cation absorption, cooling-pressurizing liquefaction, and the mixed gas (such as $H_2$, $N_2$) removing of the purification system 210. This hi-purity liquid ammonia product is able to feed into a gas supply system of a facility end of the semiconductor factory for using in the related equipment, for example, the Metal-Organic Chemical Vapor Deposition (MOCVD) equipment of the LED factory.

Figure 5:
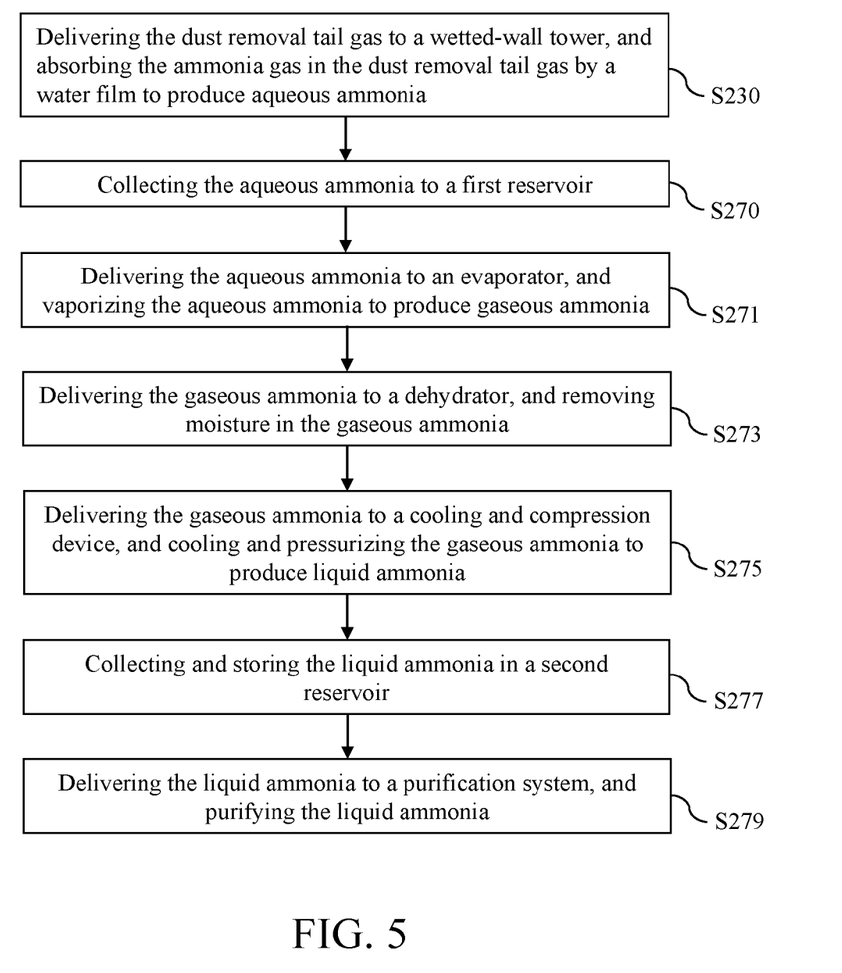
FIG. 5 is a flowchart of an exhaust gas treatment method according to the second embodiment of the present invention.

FIG. 5 is a flowchart of an exhaust gas treatment method according to the second embodiment of the present invention. Referring to FIGS. 4-5, the exhaust gas treatment method of the second embodiment is similar to that of the first embodiment with the differences that after being formed by the hydration of the ammonia gas in the tail gas and the water in the wetted-wall tower 112 (S230), the aqueous ammonia is delivered into the circulation tank 117 for its pre-collection. After a period of time, a predetermined concentration of the aqueous ammonia in the circulation tank 117 is flowed into the first reservoir 116 (S270). Then, the aqueous ammonia in the first reservoir 116 is delivered to the evaporator 121 to obtain gaseous ammonia (S271).

In addition, after collecting and storing the liquid ammonia (that is converted from the gaseous ammonia) in the second reservoir 126 (S277), the liquid ammonia is transported to the purification system 210 for purifying (S279). In this step, the liquid ammonia is purified to obtain at least 6N hi-purity liquid ammonia by vaporization, dehydration, anion-cation absorption, cooling and pressurizing liquefaction, and the mixed gas removing of the purification system 210. This hi-purity liquid ammonia product is able to feed into the gas supply system of the semiconductor or optoelectronics factory for using in the related equipment, for example, the gas supply system of the facility end of the LED factory.

Based on above, in the second embodiment of the present invention, the ammonia absorption system 110, the ammonia conversion system 120, and the purification system 210 of the exhaust gas treatment apparatus 20 form a completely closed and circular recycling design enabling eliminated ammonia emission and a large decrease in cost for the semiconductor or optoelectronics factory.

From the above description of the invention, it is manifest that various techniques can be used for implementing the concepts of the invention without departing from the scope thereof. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It is intended that the scope of the invention is defined by the appended claims.

What is claimed is:

1. An exhaust gas treatment apparatus for treating tail gas containing dust and ammonia gas from a semiconductor equipment, comprising:
    an ammonia absorption system, comprising:
        a dust scrubber for receiving the tail gas and removing the dust from the tail gas to produce dust removal tail gas;
        a wetted-wall tower connected to the dust scrubber for absorbing the ammonia gas in the dust removal tail gas and converting the ammonia gas into aqueous ammonia;
        a circulation tank connected to the wetted-wall tower for receiving the aqueous ammonia and providing an absorption solution for the wetted-wall tower, wherein the absorption solution serves to absorb the ammonia gas separated from the dust removal tail gas;
        a mist absorber connected to the wetted-wall tower for absorbing the ammonia gas that remains in the dust removal tail gas and converting the ammonia gas to low concentration of aqueous ammonia;
        a water sealed vacuum pump connected to the mist absorber for pumping, washing and exhausting the dust removal tail gas; and
        a first reservoir connected to the circulation tank for collecting the aqueous ammonia; and
    an ammonia conversion system, comprising:
        an evaporator connected to the first reservoir for vaporizing the aqueous ammonia to form gaseous ammonia;
        a dehydrator connected to the evaporator for removing moisture of the gaseous ammonia and pre-cooling the gaseous ammonia;
        a cooling and compression device connected to the dehydrator for cooling and compressing the gaseous ammonia to form liquid ammonia;
        a refrigerator connected to the cooling and compression device for supplying cryogenic liquid to the cooling and compression device and generating heat;
        a heat pump connected to the evaporator and the refrigerator respectively, the heat pump supplying the heat generated from the refrigerator to the evaporator and supplying cooling water in the ammonia conversion system; and
        a second reservoir, connected to the cooling and compression device for collecting and storing the liquid ammonia.

2. The exhaust gas treatment apparatus according to claim 1, wherein the ammonia absorption system further comprises a water feeder connected to the wetted-wall tower for supplying cooling water to the wetted-wall.

3. The exhaust gas treatment apparatus according to claim 1, wherein a temperature of the cooling water is lower than 20° C.

4. The exhaust gas treatment apparatus according to claim 1, wherein the cooling and compression device is capable of cooling below a temperature of 10° C. and compressing the gaseous ammonia to form liquid ammonia.

5. The exhaust gas treatment apparatus according to claim 1, wherein the water sealed vacuum pump further comprises a circulating water tank for absorbing, decomposing, and washing the ammonia gas that remains in the tail gas.

6. The exhaust gas treatment apparatus according to claim 1, wherein the ammonia absorption system further comprises an absorption-decomposition tank connected between the mist absorber and the water sealed vacuum pump for absorbing or decomposing the ammonia gas that remains in the tail gas.

7. The exhaust gas treatment apparatus according to claim 1, wherein a concentration of the aqueous ammonia is higher than 15%.

8. The exhaust gas treatment apparatus according to claim 1, further comprising a purification system connected to the second reservoir of the ammonia conversion system for purifying the liquid ammonia.

9. The exhaust gas treatment apparatus according to claim 8, wherein the purification system comprises an anion-cation absorber, a dehydrator, a heat pump, a refrigerator, a cooling and compression device, a deaerating device, and a rundown tank.

10. An exhaust gas treatment method, comprising:
  (a) removing dust from tail gas using a dust scrubber to produce dust removal tail gas;
  (b) absorbing and separating ammonia gas from the dust removal tail gas using a wetted-wall tower to form aqueous ammonia;
  (c) removing remaining ammonia gas in the dust removal tail gas using a mist absorber to form low concentration of aqueous ammonia;
  (d) pumping, washing and exhausting the dust removal tail gas using a water sealed vacuum pump;
  (e) collecting and storing the aqueous ammonia from the wetted-wall tower to a first reservoir;
  (f) vaporizing the aqueous ammonia using an evaporator to form gaseous ammonia;
  (g) removing moisture from the gaseous ammonia using a dehydrator;
  (h) cooling and pressurizing the gaseous ammonia to produce liquid ammonia using a cooling and compression device after removing the moisture from the gaseous ammonia; and
  (i) collecting the liquid ammonia in a second reservoir.

11. The exhaust gas treatment method according to claim 10, wherein in the steps (b) and (c), the ammonia gas is converted into the aqueous ammonia under 1 atm of pressure.

12. The exhaust gas treatment method according to claim 10, wherein the step (h) is performed at a temperature of lower than 10° C.

13. The exhaust gas treatment method according to claim 10, wherein the step (f) is performed at a temperature of higher than 20° C.

14. The exhaust gas treatment method according to claim 10, further comprising supplying a cooling water to the wetted-wall tower using a water feeder.

15. The exhaust gas treatment method according to claim 14, wherein a temperature of the cooling water is lower than 20° C.

16. The exhaust gas treatment method according to claim 10, further comprising steps of:
  providing a cryogenic liquid to the cooling and compression device using a refrigerator that generates heat; and
  supplying the heat generated by the refrigerator to the evaporator using a heat pump.

17. The exhaust gas treatment method according to claim 10, further comprising steps of:
  delivering the liquid ammonia from the second reservoir to a purification system; and
  purifying the liquid ammonia by the purification system.

18. The exhaust gas treatment method according to claim 10, further comprising steps of:
  delivering the aqueous ammonia from the wetted-wall tower to a circulation tank; and
  feeding the aqueous ammonia to the first reservoir and delivering part of the aqueous ammonia to the wetted-wall tower using the circulation tank.

19. The exhaust gas treatment method according to claim 10, wherein the ammonia gas that remains in the dust removal tail gas is absorbed and washed by a circulating water tank of the water sealed vacuum pump in the step (d).

20. The exhaust gas treatment method according to claim 10, further comprising following steps before the step (d):
  absorbing and decomposing the remaining ammonia gas from the dust removal tail gas using an absorption-decomposition tank; and
  delivering the dust removal tail gas to the water sealed vacuum pump.

* * * * *